(12) United States Patent
Brown

(10) Patent No.: US 8,379,051 B2
(45) Date of Patent: Feb. 19, 2013

(54) DATA SET CONVERSION SYSTEMS AND METHODS

(75) Inventor: Timothy E. Brown, Troy, IL (US)

(73) Assignee: The Boeing Company, Chicago, IL (US)

( * ) Notice: Subject to any disclaimer, the term of this patent is extended or adjusted under 35 U.S.C. 154(b) by 1581 days.

(21) Appl. No.: 11/843,237

(22) Filed: Aug. 22, 2007

(65) Prior Publication Data

US 2009/0052803 A1   Feb. 26, 2009

(51) Int. Cl.
*G09G 5/00* (2006.01)
*G06K 9/00* (2006.01)
*G06K 9/34* (2006.01)
*G06K 9/32* (2006.01)
*A61B 8/00* (2006.01)

(52) U.S. Cl. ........ 345/619; 382/103; 382/128; 382/173; 382/293; 600/437

(58) Field of Classification Search .................. 345/619; 382/103, 128, 173, 293; 600/437
See application file for complete search history.

(56) References Cited

U.S. PATENT DOCUMENTS

| | | | |
|---|---|---|---|
| 3,684,871 A | 8/1972 | Schaffner | |
| 5,259,063 A | 11/1993 | Salazar | |
| 5,537,519 A | 7/1996 | Vossler et al. | |
| 5,579,445 A | 11/1996 | Loce et al. | |
| 5,860,925 A * | 1/1999 | Liu | 600/443 |
| 7,274,387 B2 * | 9/2007 | Gupta et al. | 348/152 |
| 2003/0053659 A1 * | 3/2003 | Pavlidis et al. | 382/103 |
| 2004/0122314 A1 * | 6/2004 | Fattah et al. | 600/437 |
| 2004/0138560 A1 * | 7/2004 | Paladini | 600/437 |
| 2005/0228278 A1 * | 10/2005 | Chalana et al. | 600/437 |
| 2006/0009955 A1 * | 1/2006 | Gendron et al. | 703/2 |
| 2008/0074313 A1 * | 3/2008 | Willey et al. | 342/25 R |

OTHER PUBLICATIONS

Union (set theory), Wikipedia, the free encyclopedia, Sep. 12, 2009.

* cited by examiner

*Primary Examiner* — Xiao M. Wu
*Assistant Examiner* — Michael J Cobb
(74) *Attorney, Agent, or Firm* — Haynes and Boone, LLP

(57) ABSTRACT

A system, apparatus, and method(s) for at least the conversion of a radial, polar, or coordinate system model footprint or types other than rectilinear to a rectilinear footprint to facilitate visual and/or comparative analysis of similarly formatted footprints in accordance with one or more embodiments is described herein.

20 Claims, 19 Drawing Sheets

DATA SET CONVERSION SYSTEMS AND METHODS

TECHNICAL FIELD

The present disclosure relates generally to data management, and more particularly to a system, apparatus, and method(s) for the conversion and comparison of one or more data set(s) to provide one or more resulting data set solution(s).

BACKGROUND

Tools and procedures for data management, including the selection, compilation, manipulation, and conversion of data to provide a data set solution, as well as the comparison and analysis of the resultant data set are varied and typically include, among other things, a computer, computer memory and storage device, and interface for visual representation of the resultant data solution set. However, as is often the case, the comparative analysis of two or more data sets is cumbersome, if not impossible, due to the data sets being formatted differently.

For example, data sets containing substantially the same information may be plotted on a coordinate system grid using radial, polar, or rectilinear techniques, to name a few. Visually comparing data sets having substantially the same information but plotted differently is often difficult, confusing, inconsistent, time-consuming, and imprecise. When dealing with data sets such as sensor performance regions that are related to military or defense operations the problems associated with comparing data sets format differently may have undesirable results.

Accordingly, there exists a need for a system, apparatus, and method(s) that provide improved data management techniques to facilitate visual and/or comparative analysis.

SUMMARY

In accordance with an embodiment, a method of data set conversion performed on a two-dimensional closed region or "footprint" for use in comparison with similarly formatted data set(s) to provide one or more resulting solution data set(s) is described herein. The method generally includes, (1) selecting a first data set other than a rectilinear data set, the first data set having a closed boundary formed by a plurality of data points plotted on a coordinate system; (2) filling the closed boundary as needed with additional data points to form a first footprint; and (3) converting the first footprint to a first rectilinear footprint by populating the coordinate system using an interpolation operation having a tolerance field.

The method may further include, (1) selecting a second data set other than a rectilinear data set, the second data set having a closed boundary formed by a plurality of data points plotted on a coordinate system; (2) filling the closed boundary as needed with additional data points to form a second footprint; (3) converting the second footprint to a second rectilinear footprint by populating the coordinate system using an interpolation operation having a tolerance field; and (4) comparing the first rectilinear footprint and the second rectilinear footprint to form a footprint representing one of a union, an intersection, or a margin of the first rectilinear footprint and the second rectilinear footprint.

Alternatively, the method may include, (1) selecting a rectilinear footprint other than the first rectilinear footprint; and (2) comparing the first rectilinear footprint and the other rectilinear footprint to form a footprint representing one of a union, an intersection, or a margin of the first rectilinear footprint and the second rectilinear footprint.

The interpolation operation for populating the rectilinear grid that approximates each filled-in region includes, (1) accessing a vertex of the coordinate system, (2) designating a tolerance field about the vertex, (3) determining whether at least one point of a plurality of data points is contained within the tolerance field, (4) retaining the vertex and populating the first rectilinear footprint with the vertex if the at least one of the plurality of data points is contained within the tolerance field; (5) excluding the vertex from the first rectilinear if the at least one of the plurality of data points is contained within the tolerance field; and (6) performing the interpolation operation on substantially all the vertices of the coordinate system.

These and other embodiments will become readily apparent to those skilled in the art from the following detailed description of the various embodiments having reference to the attached figures, the invention not being limited to any particular preferred embodiment(s) disclosed.

DETAILED DESCRIPTION

Figure 1:
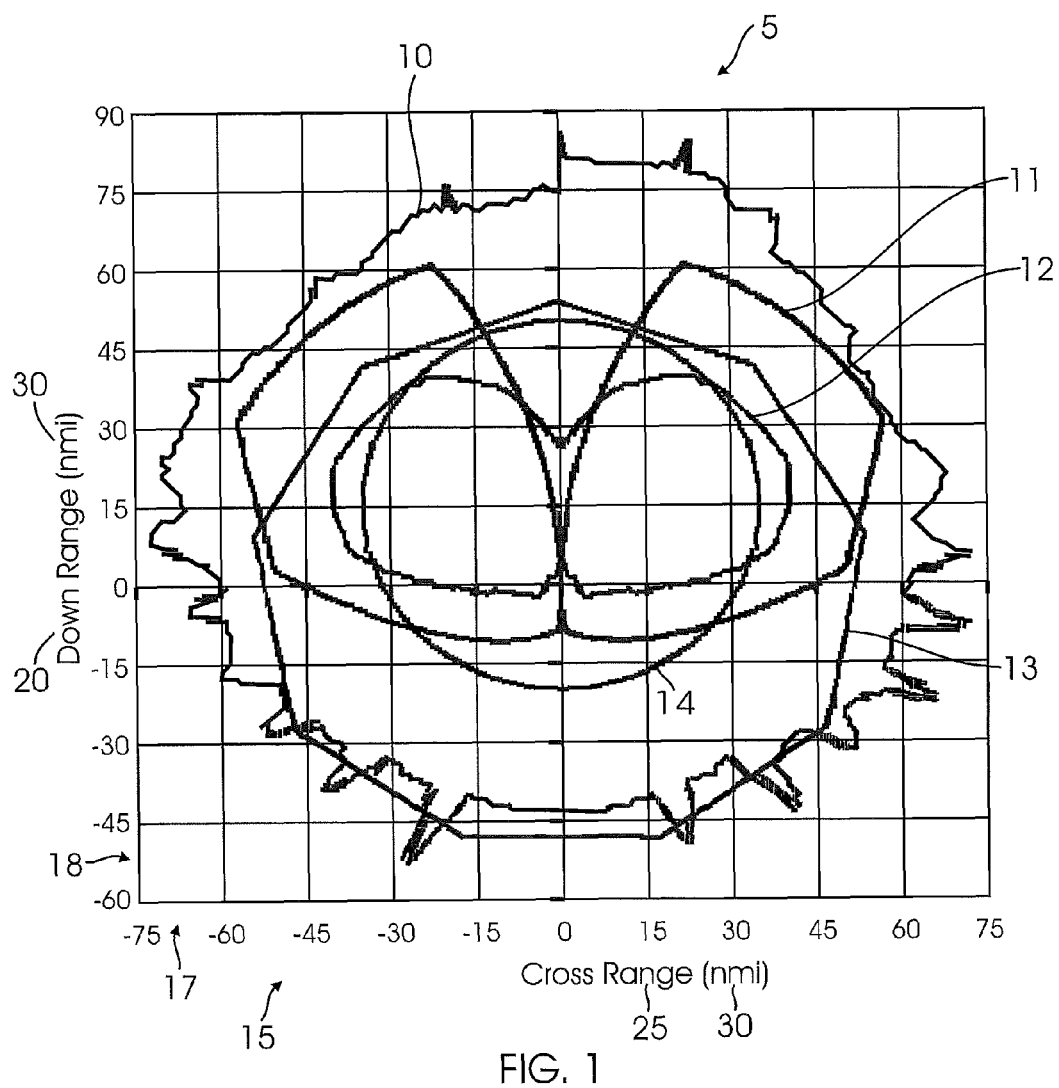
FIG. 1 shows one example of data sets representing boundaries of sensor performance regions that may be utilized with a system, apparatus, and method disclosed in accordance with an embodiment.

Embodiments will now be described with references to the accompanying figures, wherein like reference numbers refer to like elements throughout. The terminology used in the description presented herein is not intended to be interpreted in any limited or restrictive manner, simply because it is being utilized in conjunction with a detailed description of certain embodiments. Furthermore, various embodiments (whether or not specifically described herein) may include novel features, no single one of which is solely responsible for its desirable attributes or which is essential to practicing the invention herein described.

The present disclosure relates generally to data management, and more particularly to a system, apparatus, and methods for the selection, manipulation, and visual display of two-dimensional data sets using, for example, interpolation and set theory operation(s) to convert and visually and/or quantitatively compare data sets to provide one or more resulting data set solution(s) based on the operation(s) in accordance with one or more embodiments.

The system, apparatus, and methods as described herein, provide for at least, (1) an automated process that significantly reduces run-time in relatively large scale applications; (2) a quantitative comparison of selected data sets; (3) a reduction in error rate by eliminating manual data entry; (4) an increase in fidelity or reproducibility of input data and/or output data that is used in the analysis or comparison process, (5) and data set visualization for easy comprehension, synthesis, and analysis.

As used herein the term "set" is a broad term generally thought of as any collection of distinct objects considered as a whole. The elements of a set can be anything: numbers, people, letters of the alphabet, other sets, and more particularly a "data set" may contain plotted data elements or data points corresponding to a position plotted on a coordinate system. Such coordinate systems may include vertices corresponding to the intersection of the x-axis and the y-axis of a Cartesian or rectangular system, or an angle and distance relationship of a polar or radial system. A set generally cannot contain two or more identical elements. A data set or "data structure" is further understood to include a physical or logical relationship among data elements designed to support specific data manipulation functions.

The data sets, structures, or regions may be any arbitrary two-dimensional closed boundary having data elements or points contained within the defined or static boundary and plotted on a coordinate system grid or lattice, herein referred to as a "footprint". In this regard, when referring to a selected data set or region the term "arbitrary" is intended to indicate that the footprint of the selected data set or region may include any regular or irregular shape. For example, the selected shape of the footprints or regions for eventual comparison may include a circle, oval, or pyramid, but more likely will include an irregular shape such as those used in the figures to describe the sensor performance footprints disclosed herein.

Furthermore, such arbitrary footprints may include relatively more complex patterns having holes (regular or irregular shaped pattern anomalies) within the closed boundary.

Accordingly, for purposes of simplicity, sensor performance regions 5, such as those shown in FIG. 1 and their corresponding footprints that provide data or information related to defense systems including, among others, electronic support measure (ESM) 10, radar 11, electro-optical/ infrared (EO/IR) 12, weapon 13, and threat 14 footprints are used to facilitate an understanding of the apparatus and methodology of the disclosure. Persons of ordinary skill in the art will understand that other data sets representing a wide variety of footprints may be utilized by various organizations, person(s), etc., including, for example, analysis, modeling, simulation, and experimentation (AMSE) within the scope and teachings of the disclosure.

The "union" of a collection of sets is generally understood to mean a set that contains all the elements that belongs to any of the sets, but nothing else. For example, if A and B are sets, then the union of A and B is the set that contains all the elements of A and all the elements of B, but no other elements.

The "intersection" of two sets is generally understood to be the set made up of non-unique or "common" elements, i.e., those elements contained in both sets.

The "margin" of two or more sets is generally understood to be the set made up of those elements contained in one of the sets but not in any of the other sets.

FIG. 1, as well as other figures contained herein, show data sets and/or footprints 10-14 and/or other various elements presented or plotted on a coordinate system grid or lattice 15. It will be understood that although the grids include x-axis 17 and y-axis 18 nomenclature (down-range 20, cross-range 25, etc.) and scale valves (nautical miles) 30, other nomenclature and scale valves may be utilized and that the actual distance, size, relationship, etc., of various elements presented are not intended to be limiting as the figure(s) may or may not be drawn precisely to scale.

The system, apparatus, and methods described herein and shown in the figures for at least data set conversion are described relative to a single radial-filled sensor performance footprint with the understanding that a wide variety of other footprints formed with radial, polar, or a fill technique other than rectilinear may be selected for conversion to a rectilinear footprint and that two or more rectilinear footprints are preferably used for a subsequent comparative analysis.

Figure 2:
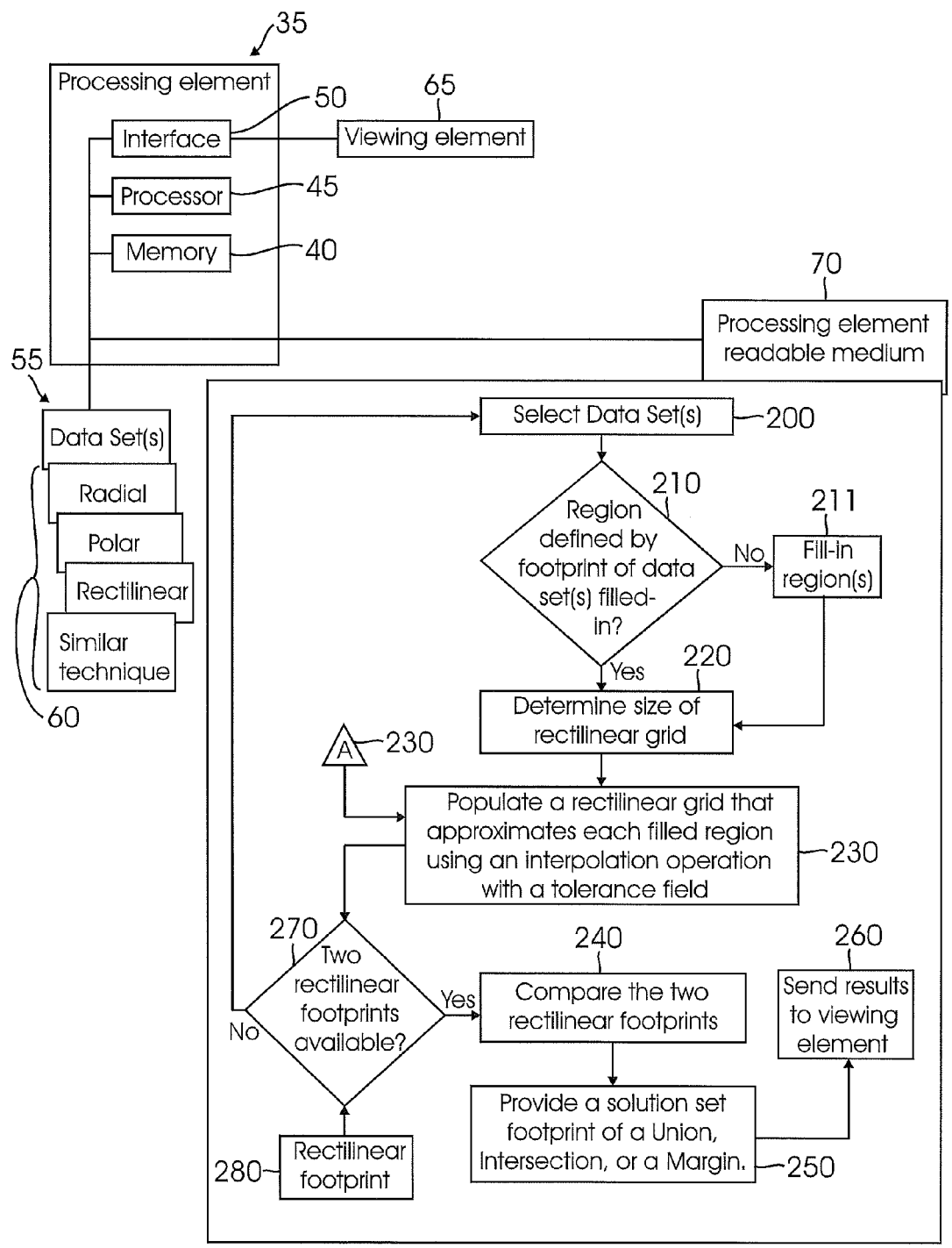
FIG. 2 is a flow chart showing a system, apparatus, and method of data set conversion and comparison in accordance with an embodiment.

FIG. 2 is a flow chart showing an embodiment of a method of data set conversion performed on a two-dimensional closed region or footprint for use in comparison with a similarly formatted data set(s) to provide one or more resulting solution data set(s) as disclosed herein. In one embodiment, the methods disclosed herein are typically implemented on a processing element 35 such as a computer or similar device having, among other things, an operating system, various storage and memory device 40 capabilities, a central processor 45, operation of software methodology, and interface technology 50.

In this regard, the central processor 45 of the processing element 35 may have access by communication coupling to the memory 40. The memory 40 may include volatile and/or non-volatile memory, and typically stores content, data, or the like. For example, the memory 40 typically stores software applications, instructions, processing programs, or the like for the central processor 45 to perform tasks associated with operation of the processing element 35. As explained below, the memory 40 may store one or more databases including data sets 55, such as footprints 60, plotted on various coordinate system models obtained from an external source.

The central processor 45 may further be coupled directly or wirelessly to a communication and/or user interface included in interface technology 50 or other means for transmitting and/or receiving data in various forms between the processing element 35 and external entities. Such user interfaces may include, for example, a keyboard or keypad, a mouse or other pointing device, and a viewing element such as a monitor or other display 65.

The method described herein is preferably developed in Excel using visual basic as a program language and embodied in a processing or computer-readable medium 70 as executable instructions that can be used to direct a processing program when used by a processing element 35 such as a computer. Such computer-readable medium 70 may include, but is not limited to, any kind of storage or memory media such as magnetic tape, floppy disks, conventional hard disks, CD-ROMS, Flash ROMS, nonvolatile ROM, and RAM. Persons of ordinary skill in art will understand that other applications using other program languages may be utilized within the spirit and scope of the disclosure.

As further shown in FIG. 2, the method preferably includes (1) selecting or importing at least a first data set and a second data set each having a closed boundary, as shown in block 200; (2) if not already done, fill-in an interior data region for each of the data sets defined by the boundary, as shown in blocks 210 and 211; (3) determining of defining a grid size for each data set, as shown in block 220; (4) populate a first and a second rectilinear grid that approximates each filled-in region using an interpolation operation having a tolerance field to form a first and a second rectilinear footprint, as shown in block 230; (5) comparing the first and second rectilinear footprints, preferably using a set theory operation(s), as shown in block 240; and (6) providing a solution data set or footprint representing a union, an intersection, and/or a margin of the compared data sets data based on the operations, as shown in block 250. The results of the comparison may then be sent to a viewing element, as shown in block 260.

As further shown in block 270 of FIG. 2, if two rectilinear footprints are not available for comparison, the method returns to block 200 to generate a second rectilinear footprint, or as shown in block 280, a rectilinear footprint may be obtained from another source.

Figure 3:
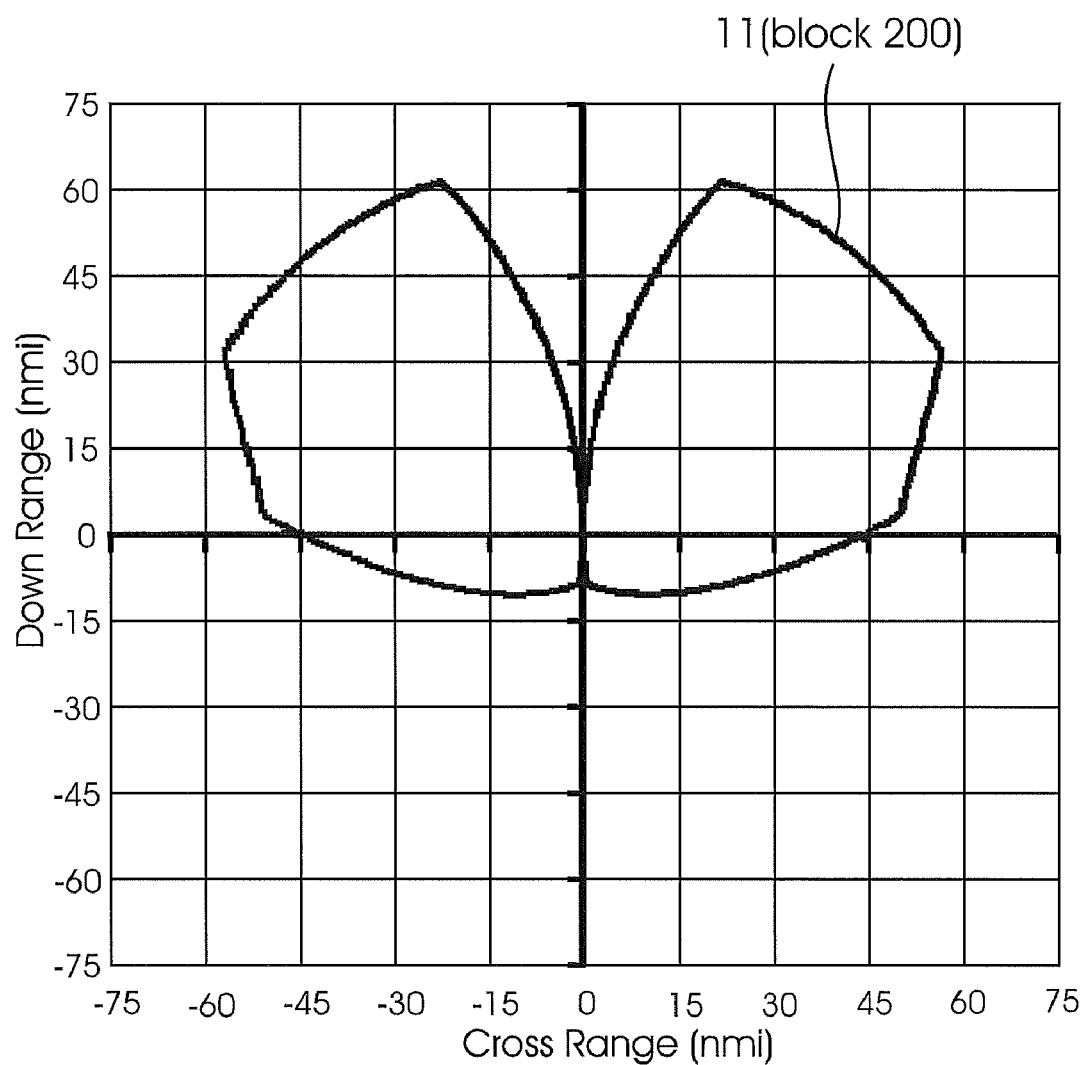
FIG. 3 shows a closed boundary of a radar sensor performance data set of FIG. 1 in accordance with an embodiment.
Figure 4:
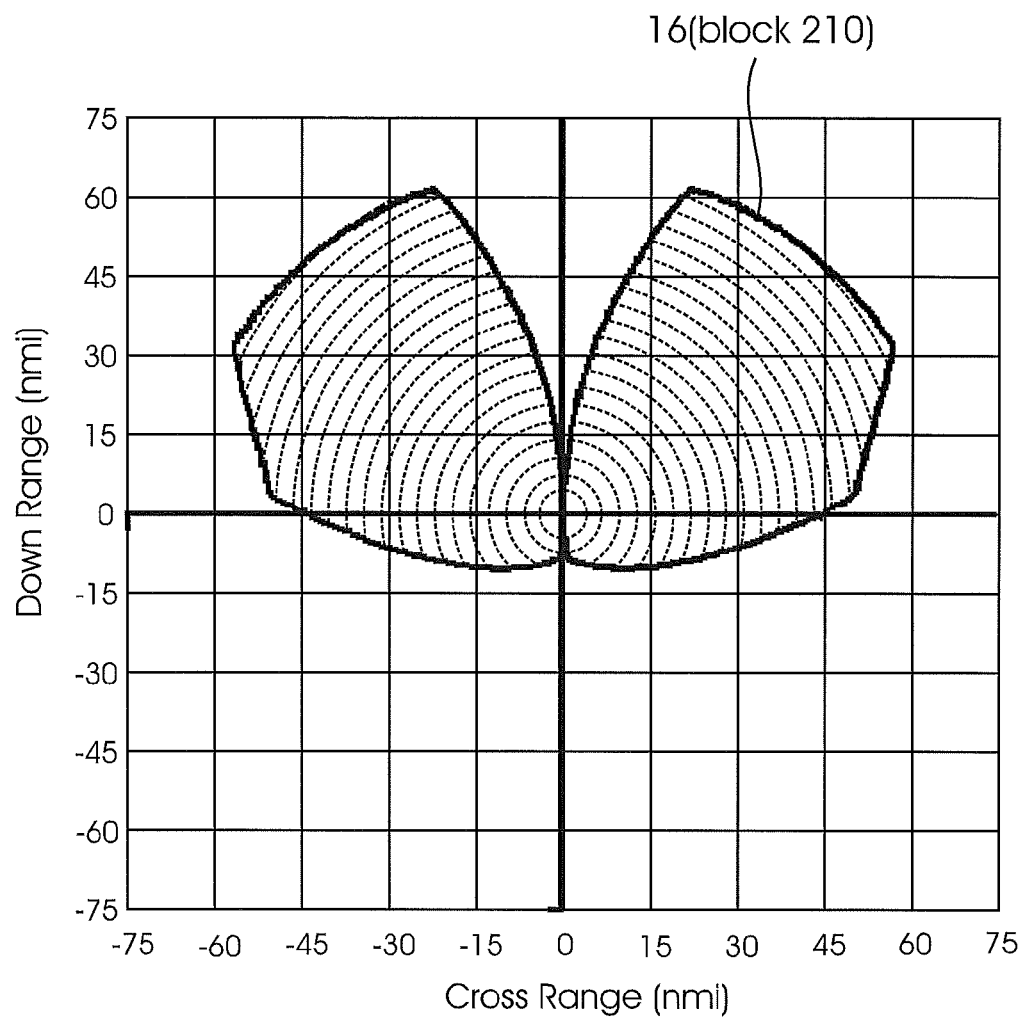
FIG. 4 shows the closed boundary of FIG. 3 radially-filled to form a footprint of the radar sensor performance region in accordance with an embodiment.

As shown in FIG. 3, a data set or sensor performance region 11 is selected and, as shown in FIG. 4, if not already done, the closed-in boundary is filled-in using any appropriate fill technique to form a corresponding footprint 16. In one embodiment, the system, apparatus, and methods described herein provide for detailed sensor analysis of various defense conditions for use in rectilinear lattice mission level models. Accordingly, when converting a radial, polar, or a coordinate system model footprint other than rectilinear, a rectilinear grid or lattice sized to accommodate the footprint is then generated.

Accordingly, values corresponding to the minimum and maximum positive and negative x-axis and y-axis points of the footprints to be converted are determined, an additional ten percent is included, and a rectilinear grid or lattice sized to accommodate the footprint is formed. Preferably, final resizing of one or both rectilinear grids to be compared is done to facilitate visual and/or comparative analysis of the similarly scaled rectilinear grids.

Alternatively, after a coordinate system model footprint is selected, limits for a rectilinear grid or lattice sized to accommodate the footprint may be determined prior to the closed-in boundary being filled in using a radial, polar, or a fill method other than rectilinear.

Figure 5:
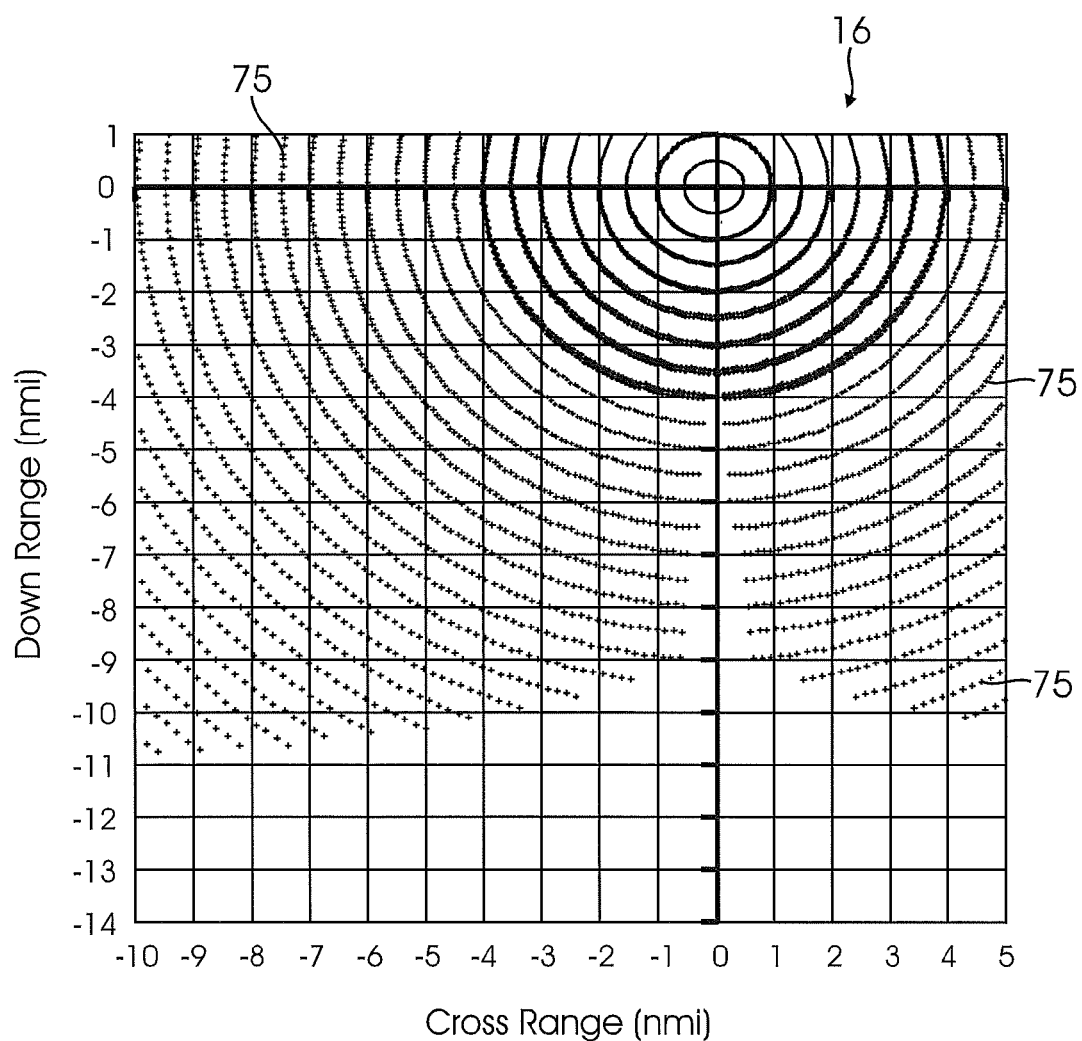
FIG. 5 shows an enlarged view of the radial footprint of FIG. 4 with a plurality of individual radial points representing a portion of the radial footprint of FIG. 4 in accordance with an embodiment.
Figure 6:
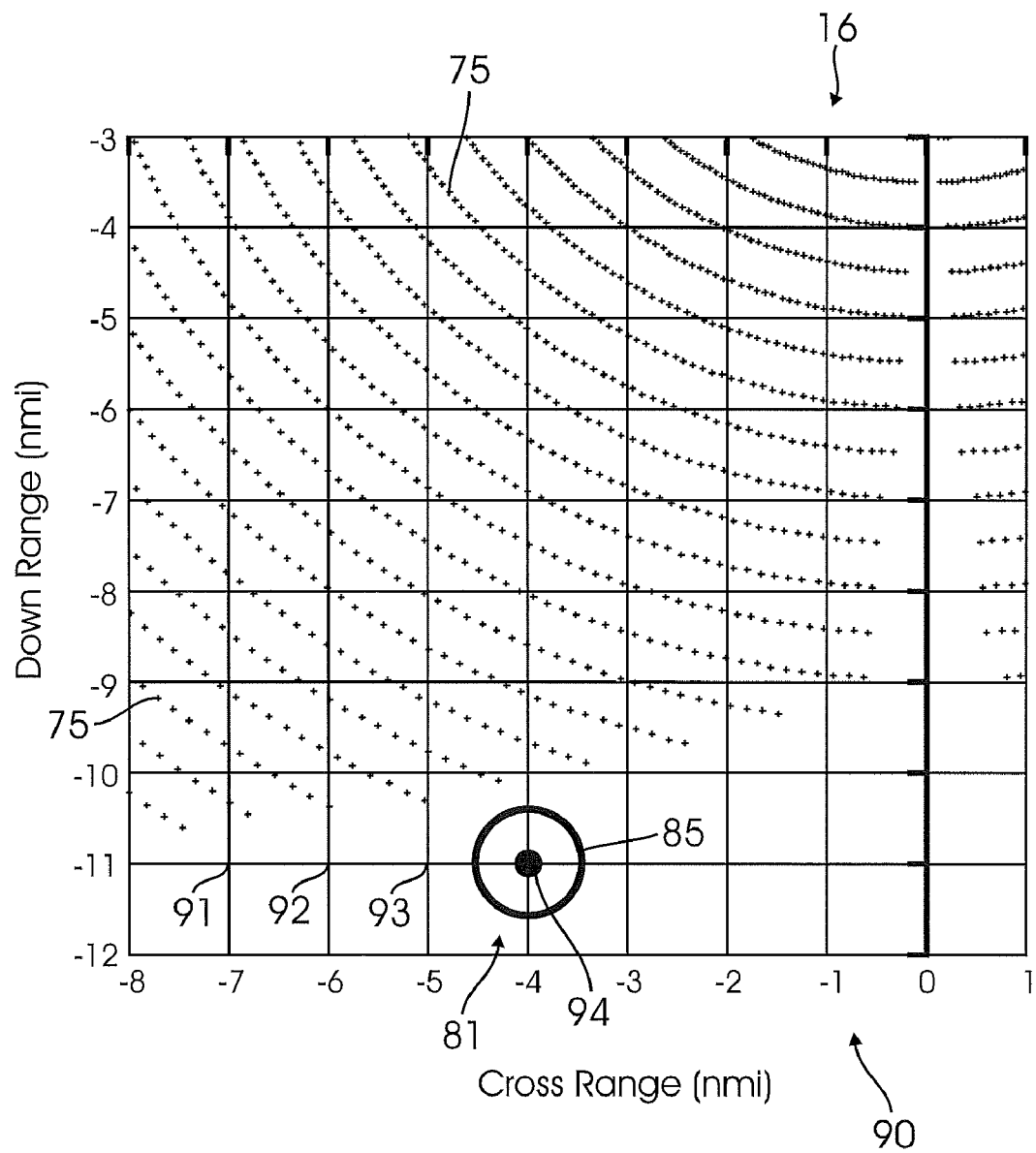
FIG. 6 is an enlarged view of the plurality of individual radial points of FIG. 4, and shows an interpolation operation having a tolerance field used to populate a rectilinear grid that approximates the filled region in accordance with an embodiment.
Figure 7:
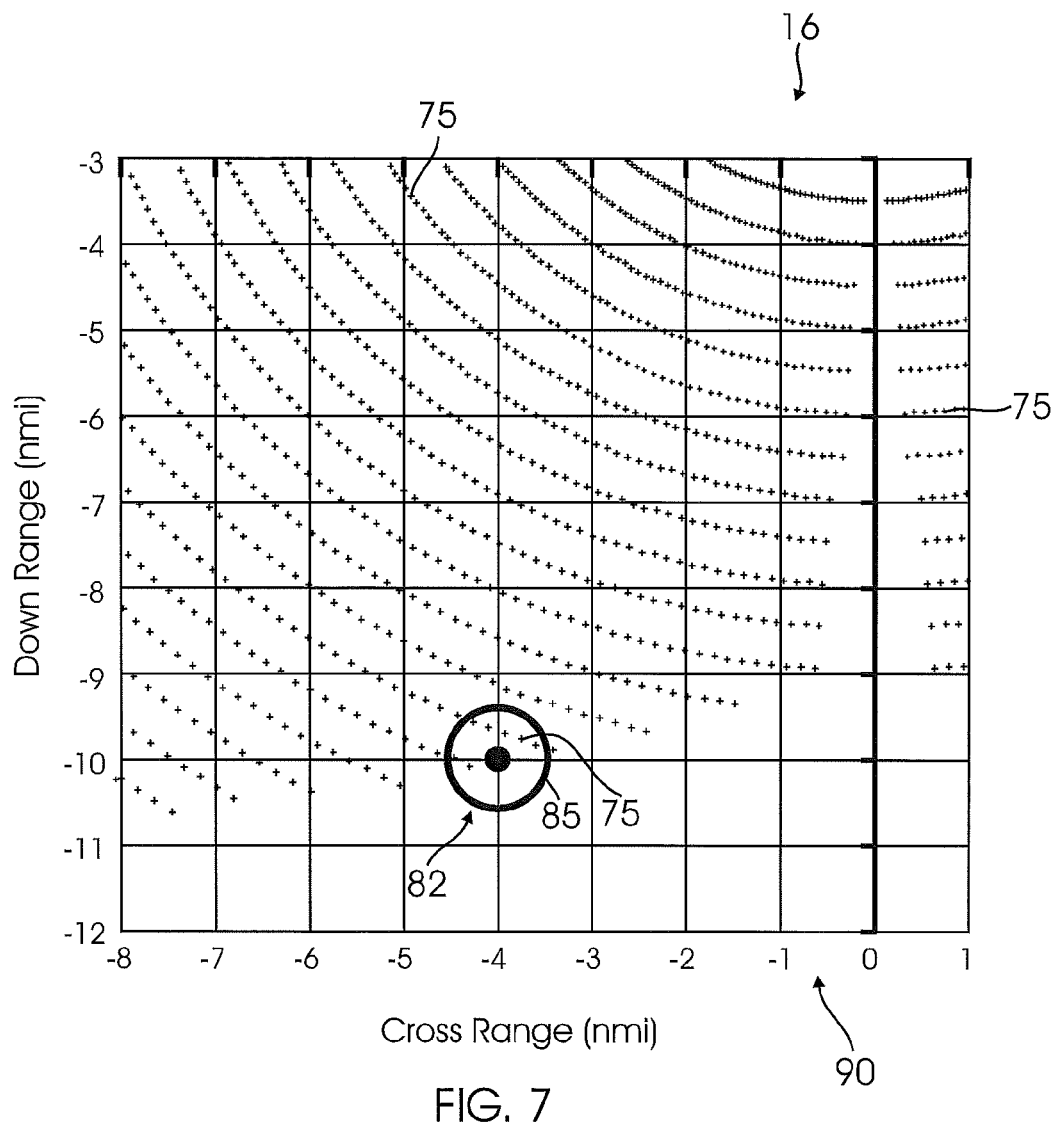
FIG. 7 is similar to FIG. 6 and shows an interpolation operation having a tolerance field used to populate a rectilinear grid that approximates the filled region in accordance with an embodiment.

FIG. 5 shows an enlarged view of the radial footprint 16 of FIG. 4 with a plurality of individual radial points 75 representing a portion of the radial footprint 11. FIG. 6 and FIG. 7 are enlarged views of the plurality of individual radial points 75 representing a portion of the radially-filled footprint 16 of FIG. 5. Each figure generally shows a single step 81, 82 of a plurality of steps of an interpolation operation 230 having a tolerance field 85 used to populate a rectilinear grid 90 that approximates each filled-in region 16. Preferably, the method of populating a rectilinear grid, as described below, is done for all vertices 91, 92, 93, 94 ... etc., of the rectilinear grid 90. In an embodiment, the method of populating a rectilinear grid to form a rectilinear footprint may begin on a grid at a vertex having a maximum negative valve for the x-axis and y-axis (extreme lower left hand vertex of the gird) 91, and proceed in a zigzag type pattern from right-to-left, bottom-to-top, and left-to-right sequentially to access substantially all of the vertices. Persons of ordinary skill in the art will understand that the exact order (sequentially, randomly, etc.) that may be employed to access each of the vertices 91, 92 ... etc., is not important so long as most, if not all, of the vertices are accessed.

Figure 8:
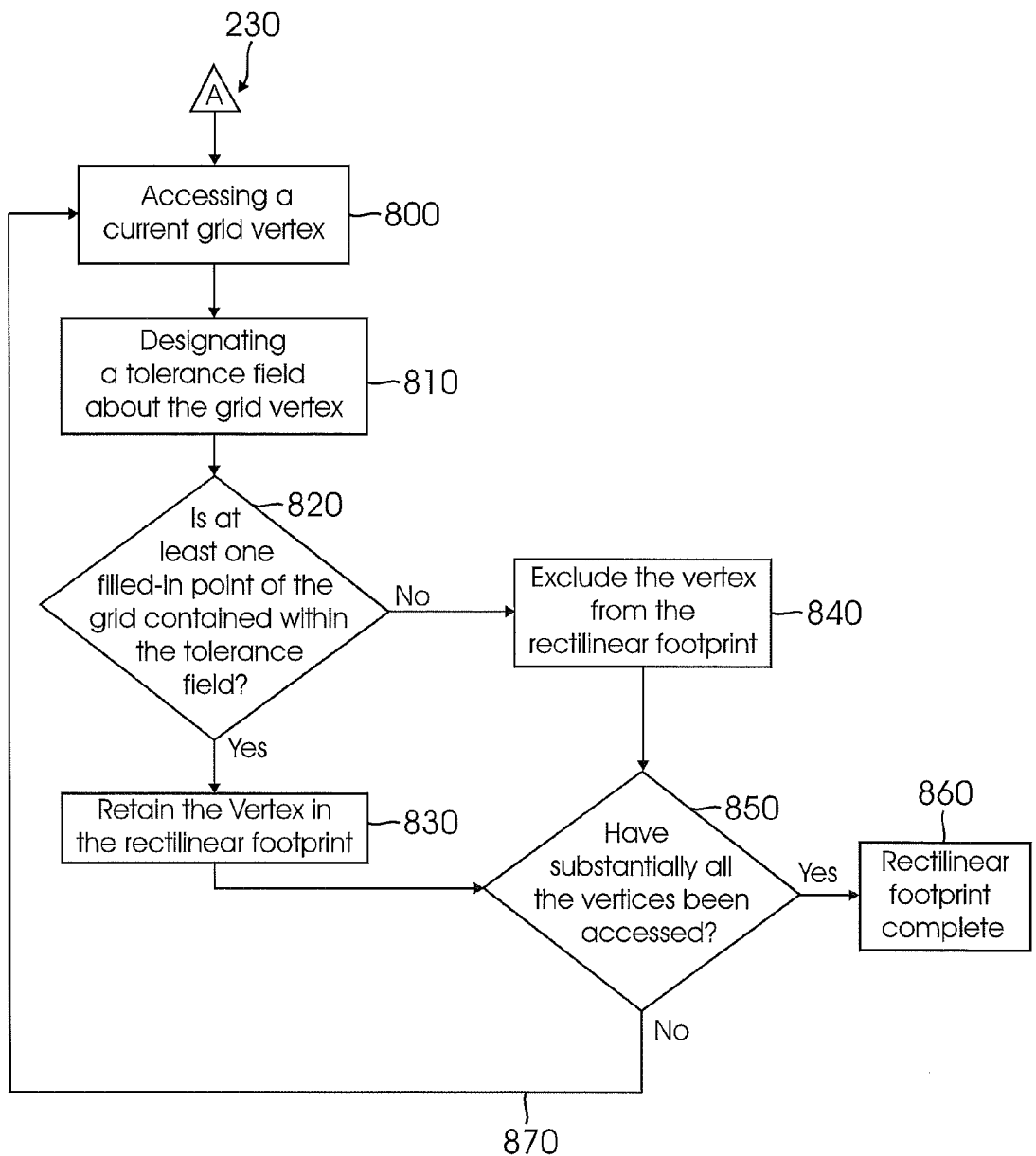
FIG. 8 is a flowchart showing an interpolation operation for populating a rectilinear grid that approximates a footprint having a filled region other than rectilinear in accordance with an embodiment.

FIG. 8 is a flowchart showing an interpolation operation 230 for populating a rectilinear grid 90 that approximates a radially-filled region or footprint 16, the operation includes (1) accessing a current grid vertex of the coordinate system, as shown in block 800; (2) designating a tolerance field about the current grid vertex, as shown in block 810; (3) determining whether at least one radial point of a radially-filled footprint is contained within the tolerance field, as shown in block 820; (4) retaining those vertices and populating a rectilinear footprint with the vertices that include at least one radial point of a radially-filled footprint contained with the tolerance field, as shown in block 830; (5) excluding those vertices from populating a rectilinear footprint that do not include at least one radial point of a radially-filled footprint within the tolerance field, as shown in block 840; and (6) performing the interpolation operation on substantially all the vertices of the coordinate system, as shown in block 850. If substantially all the vertices have been accessed, the rectilinear grid is complete and ready for comparison with another similarly scaled rectilinear footprint, as shown in block 860. If however, substantially all the vertices have not been accessed, the interpolation operation 230 continues until substantially all of the vertices have been accessed, as shown by flow-path 870.

Figure 15A:
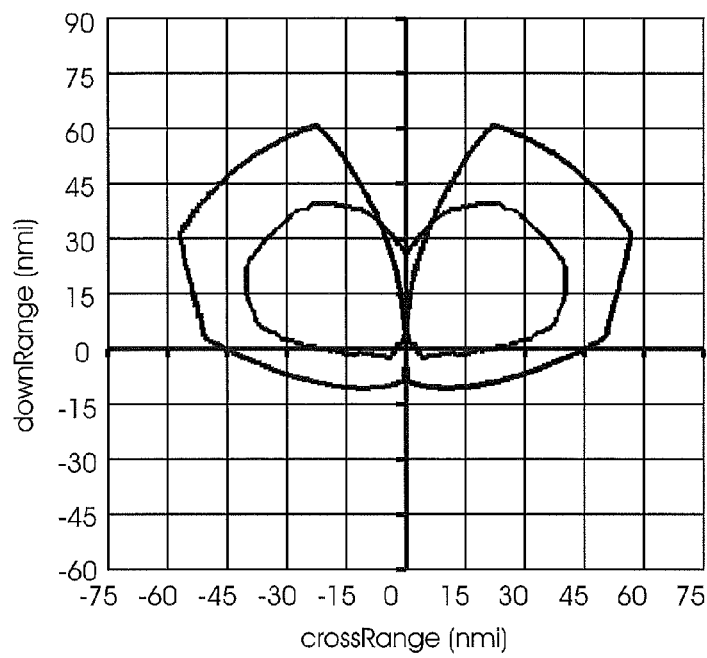
FIGS. 15(*a*)-(*b*) show other examples of solution data sets, combined performance regions, or footprints for a union of various sensor footprints of FIG. 1 in accordance with an embodiment.
Figure 15B:
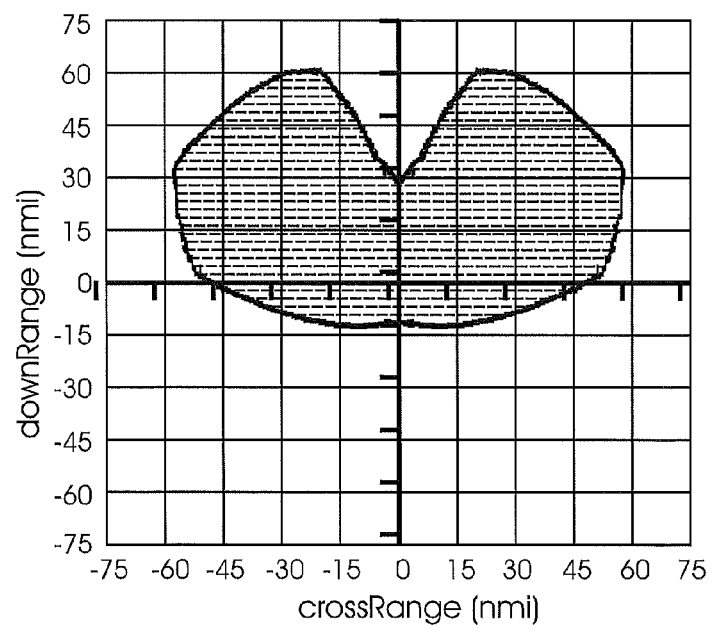
Figure 16A:
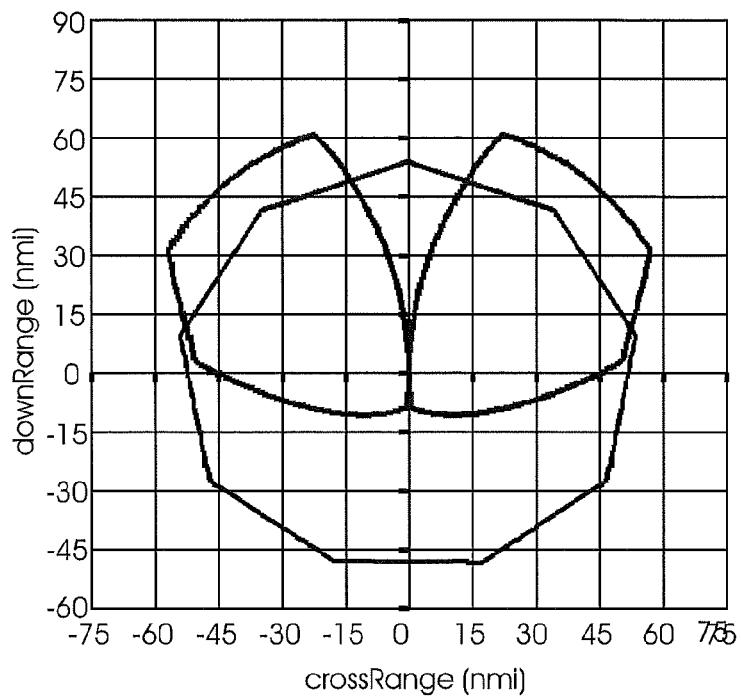
FIGS. 16(a)-(b) show still other examples of solution data sets, combined performance regions, or footprints for an intersection of various sensor footprints of FIG. 1 in accordance with an embodiment.
Figure 16B:
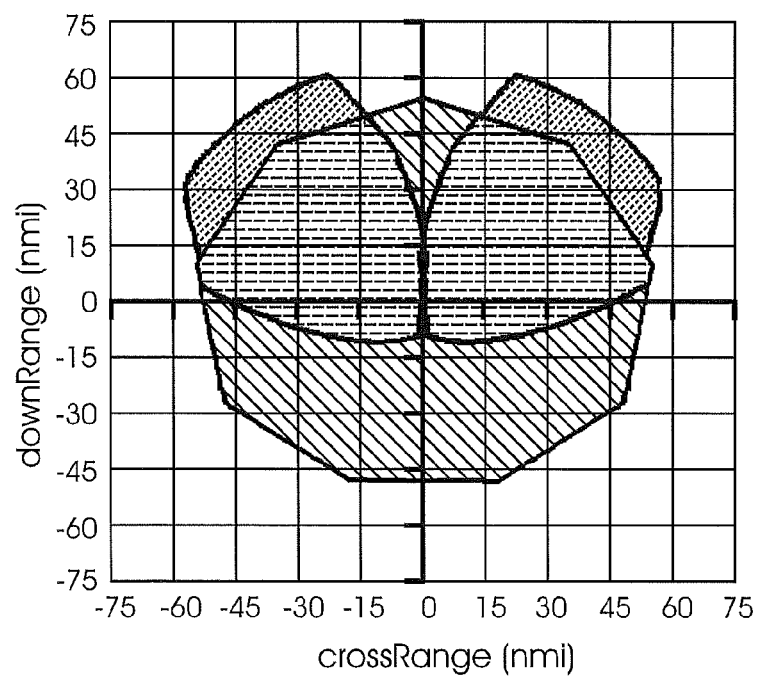

Accordingly, as shown in FIG. 6, since there are no radial points 75 contained within the tolerance field 85 about the vertex 94 designated at grid location (−4, −11), that vertex is excluded or not retained in the conversion to a rectilinear footprint. That is, the vertex (−4, −11) is not a point included in the rectilinear-filled footprint (see for example, FIGS. 15(*b*) and 16(*b*)) that approximates the radially-filled footprint 16.

In contrast to FIG. 6, FIG. 7 shows at least one radial point 75 contained within the tolerance field 85 about the vertex designated at grid location (−4, −10). Accordingly, the vertex at grid location (−4, −10) is retained to populate the rectilinear footprint.

As indicated in block 850 of the flowchart of FIG. 8, the interpolation operation 230 is repeated at substantially all the vertices of the grid. In this way, a grid having a radially-filled footprint 16 is converted to a grid having a rectilinear filled-footprint that approximates the radially-filled footprint 16 using an interpolation operation 230 having a tolerance field 85.

Figure 9:
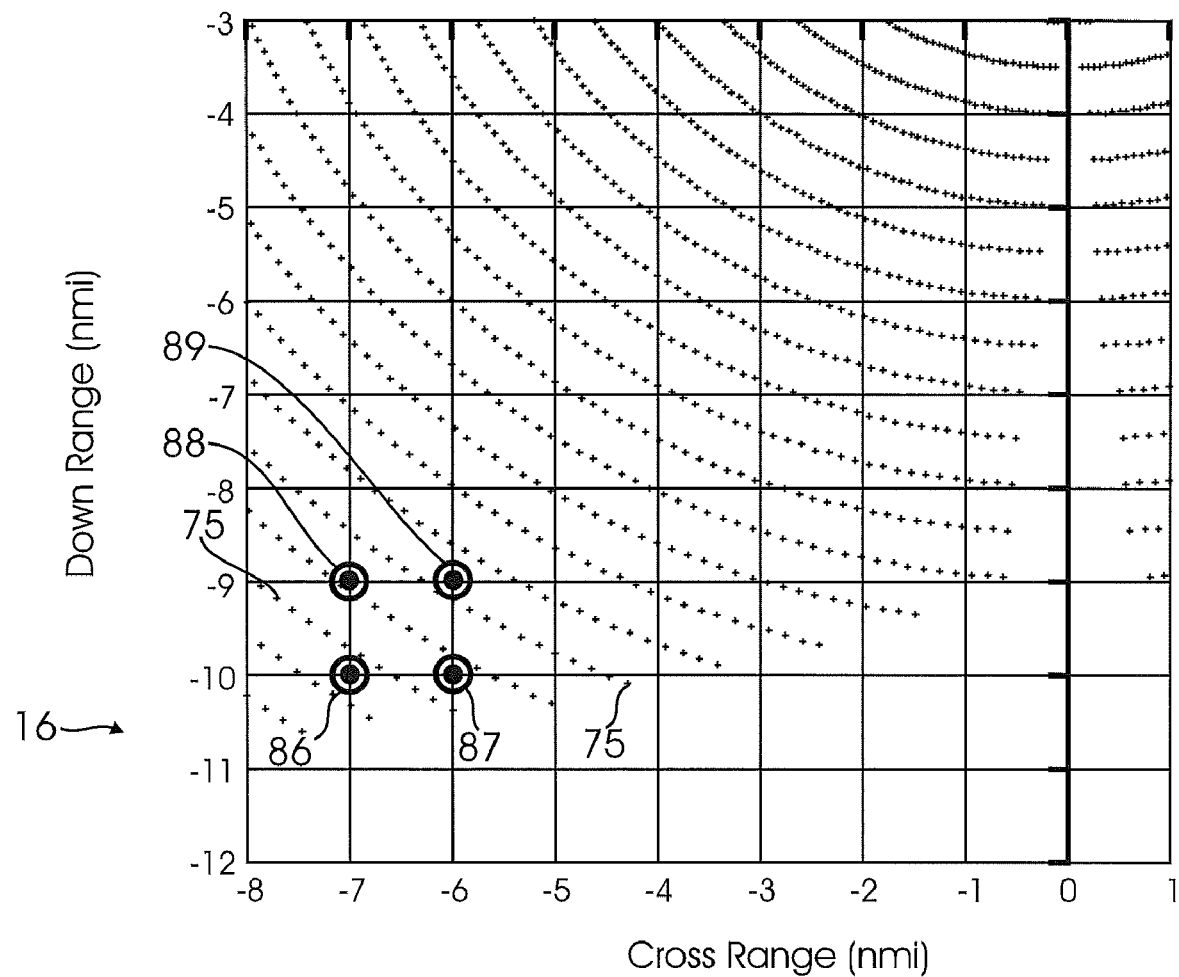
FIGS. 9-11 show examples of the overlap and the non-overlap of a tolerance field due to variations in tolerance field size in accordance with an embodiment.
Figure 10:
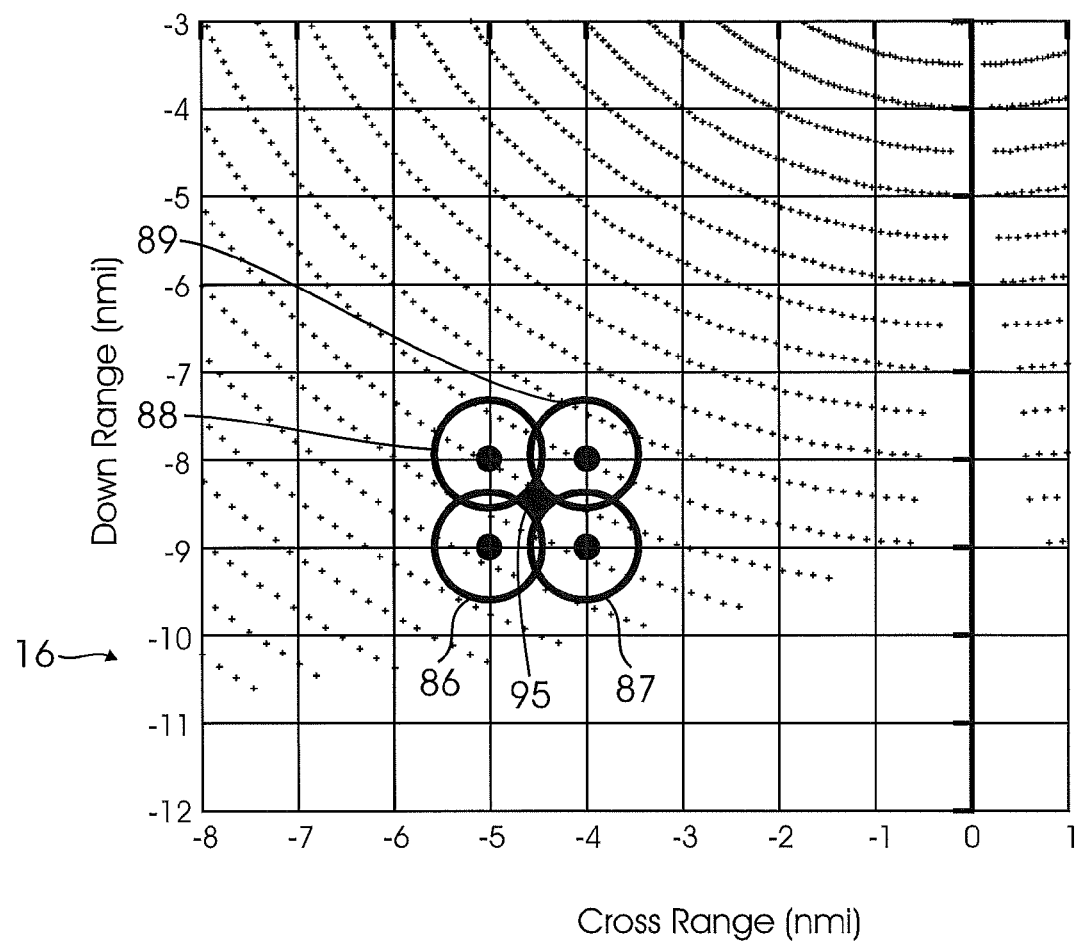
Figure 11:
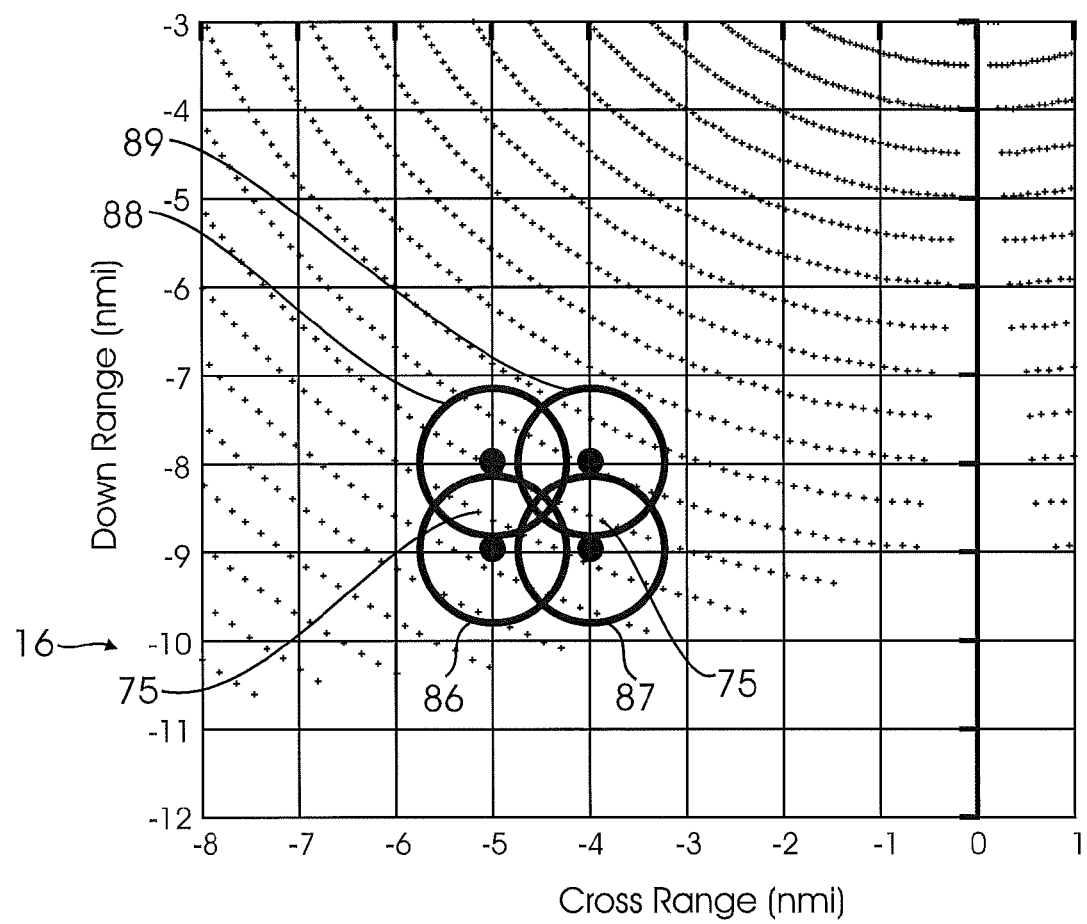

FIGS. 9-11 show examples of radial data point coverage resulting from the overlap or non-overlap of tolerance fields 86-89 due to variations in tolerance field size. As shown in FIG. 9, when a tolerance field 86-89 about a vertex is relatively small, some radial data points 75 and some corresponding vertices (−7, −10), (−6, −10) are excluded or not retained for populating the rectilinear grid or lattice to form the rectilinear footprint that approximates the radial footprint 16. As shown in FIG. 10, when tolerance fields 86-89 are large enough to overlap the tolerance field of adjacent vertices (those positioned immediately above, below, and on either side (right and left) along horizontal and vertical grid lines) there may still be some radial data points 75 of the radial footprint 16 that are not within a tolerance field, i.e., those radial points in area 95, and therefore excluded or not retained for populating the rectilinear grid or lattice. However, as shown in FIG. 11, preferably, tolerance fields 86-89 are of a sufficient size to overlap tolerance fields positioned immediately above, below, on either side along horizontal and vertical grid lines, and diagonally. In this regard, having radial points 75 contained in two or more tolerance fields 86-89 is generally not a problem with run-time computation or duplication of data because only the vertices are retained in forming the corresponding rectilinear footprint, not the individual fill data points 75 of a particular coordinate system grid.

Figure 12:
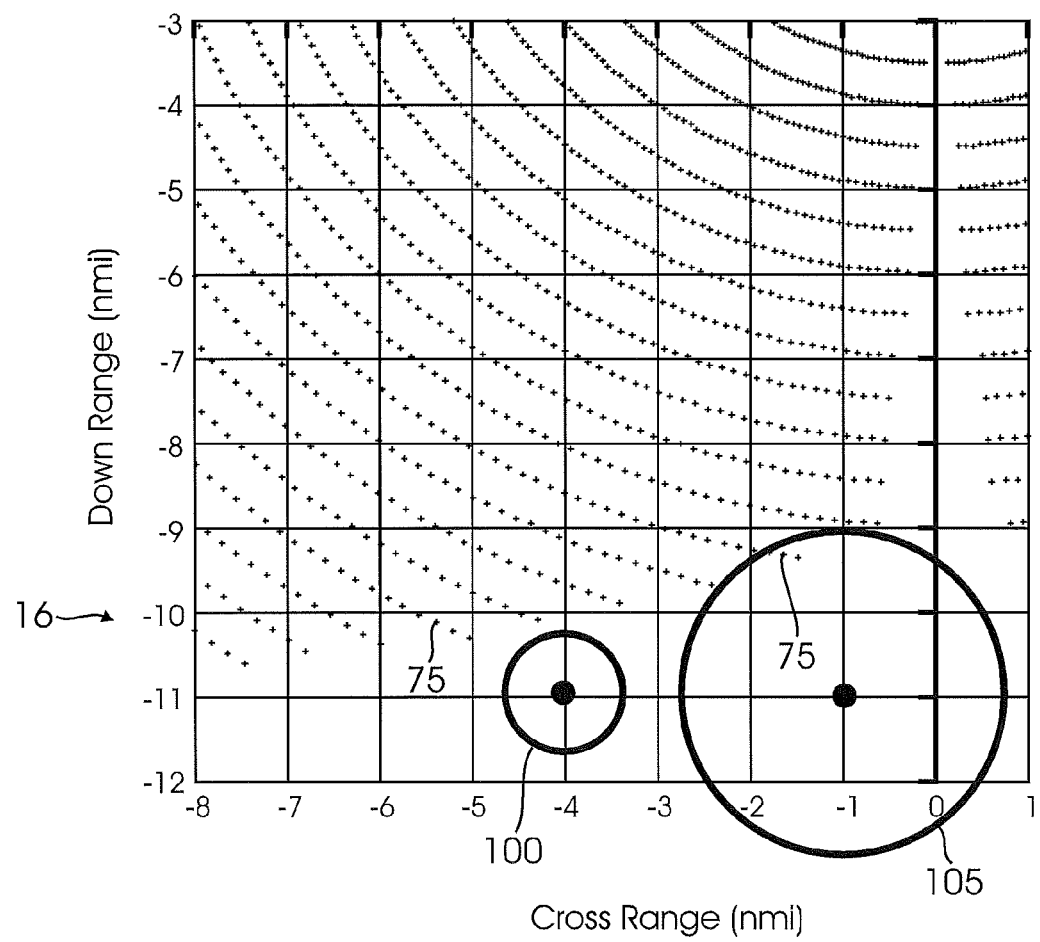
FIGS. 12-13 show examples of a tolerance field size and the result of those tolerance fields when forming a rectilinear grid that approximates a footprint having a filled region other than rectilinear in accordance with an embodiment.
Figure 13:
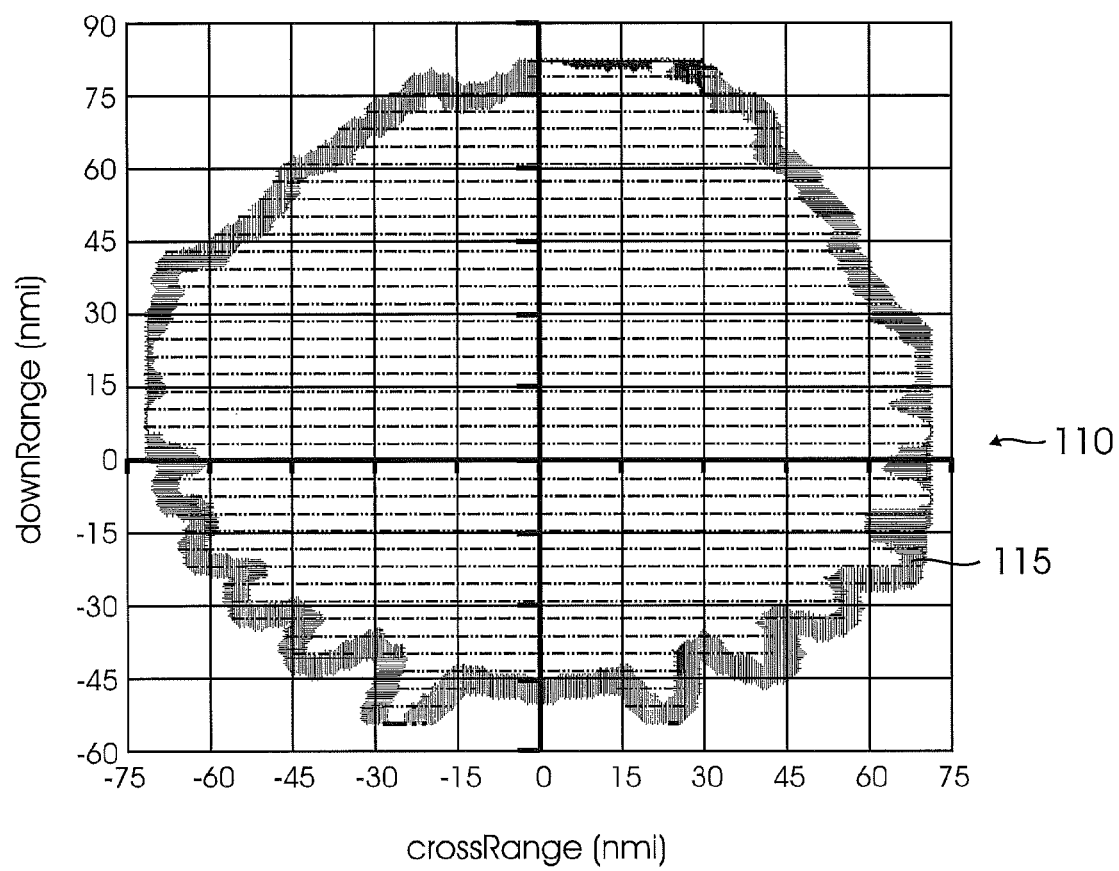

FIG. 12 and FIG. 13 show the results of utilizing a preferably sized tolerance field 100 and a relatively larger tolerance field 105. In this regard, when using the relatively smaller sized tolerance field 100, the vertex located at (−4, −11) is excluded from populating a rectilinear grid 110 as no radial points 75 are contained within the tolerance field 100. However, when using the relatively larger tolerance field 105, the vertex located at (−1, −11) is retained for populating the rectilinear grid 110 resulting in a rectilinear footprint 115 having a relatively poor approximation of radial footprint, as shown in FIG. 13.

As indicated above, in an embodiment, two similarly sized/scaled rectilinear footprints are made available for visual and/or comparative analysis. In this regard, both rectilinear footprints may be generated by the conversion method disclosed herein and shown at least in FIGS. 2 and 9. Alternatively, a first rectilinear footprint may be generated by the conversion method 230 disclosed herein and a second rectilinear footprint may be obtained from memory or from some other source 55 and inputted into the system for comparative purposes. Preferably, point-by-point comparison (block 230 of FIG. 2) of the first rectilinear footprint and the second rectilinear footprint is preformed using well-known set theory operations to generate a solution data set(s) representing a union, intersection and/or margin of the two rectilinear footprints (block 250 of FIG. 2).

Figure 14A:
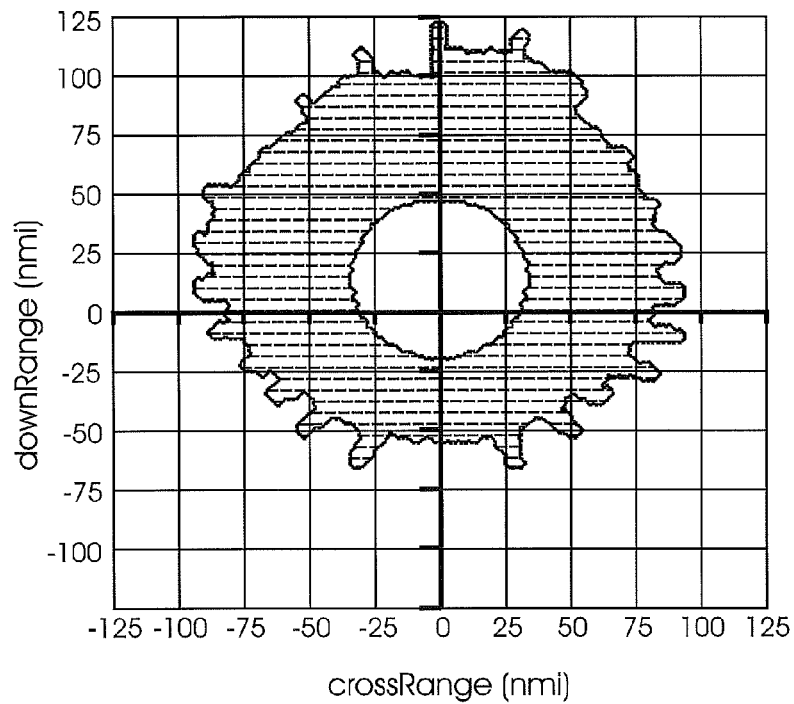
FIGS. 14(*a*)-(*c*) show examples of solution data sets, combined performance region, or footprint for a margin of the ESM footprint and the threat footprint of FIG. 1 in accordance with an embodiment.
Figure 14B:
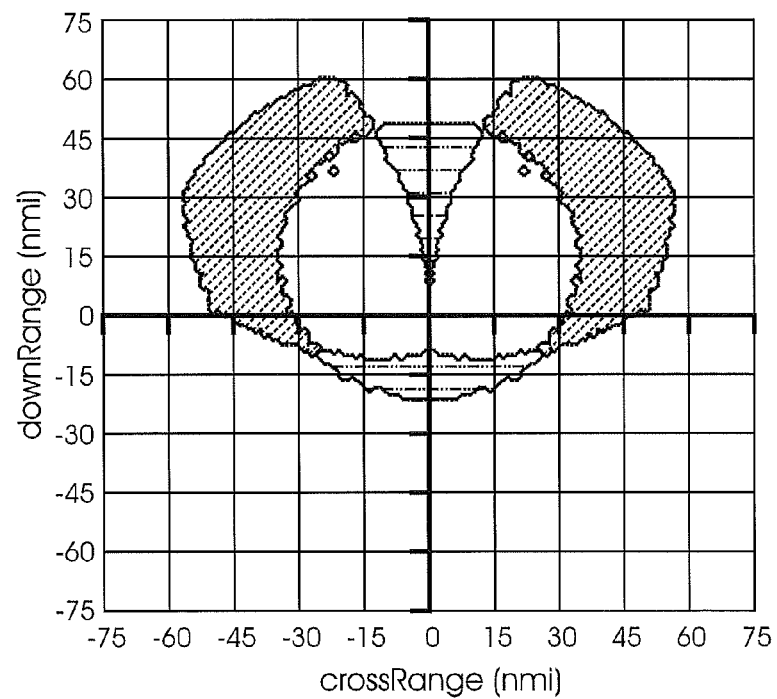
Figure 14C:
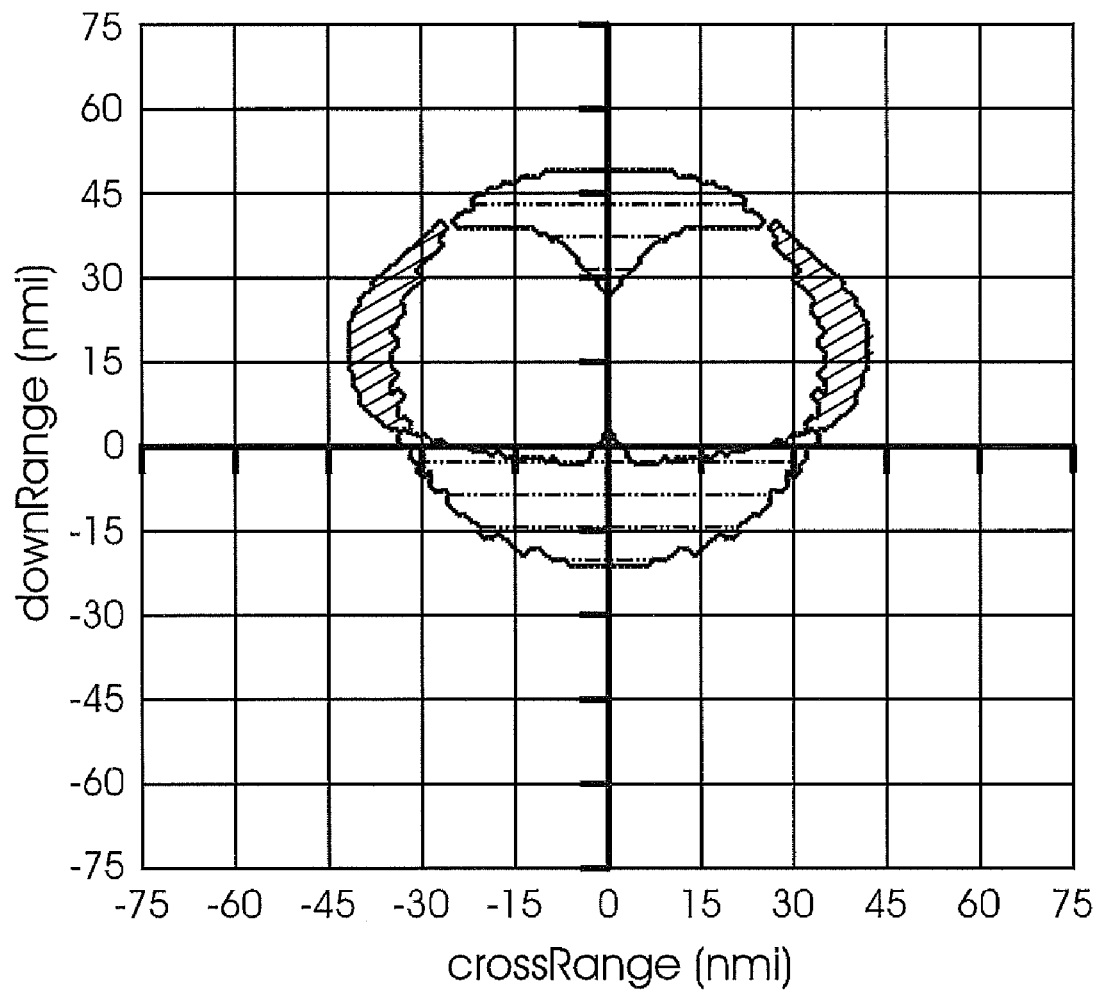

FIG. 14(a) shows an example of a solution data set, combined performance region, or footprint for the margin of the ESM footprint 10 and the threat 14 footprint shown in FIG. 1. In terms of data information, the ESM footprint 10 represents a region where a first entity (friend) is able to detect (for example, listen to radio communications, etc.) a second entity (foe), and the treat footprint 14 represents a region where the second entity is able to detect the first entity. Accordingly, the resultant margin data set or footprint of the ESM region 10 and threat region 14 represents an area where the first entity is able to detect the second entity, but the second entity is unable to detect the first entity. In other words, the margin region between the ESM and threat regions 10, 14 represents a "safety zone" for the first entity to operate without being detected by the second entity. FIGS. 14(b)-(c) show other examples of a solution data set, combined performance region, or footprint for the margins of other compared footprints shown in FIG. 1.

Figure 17A:
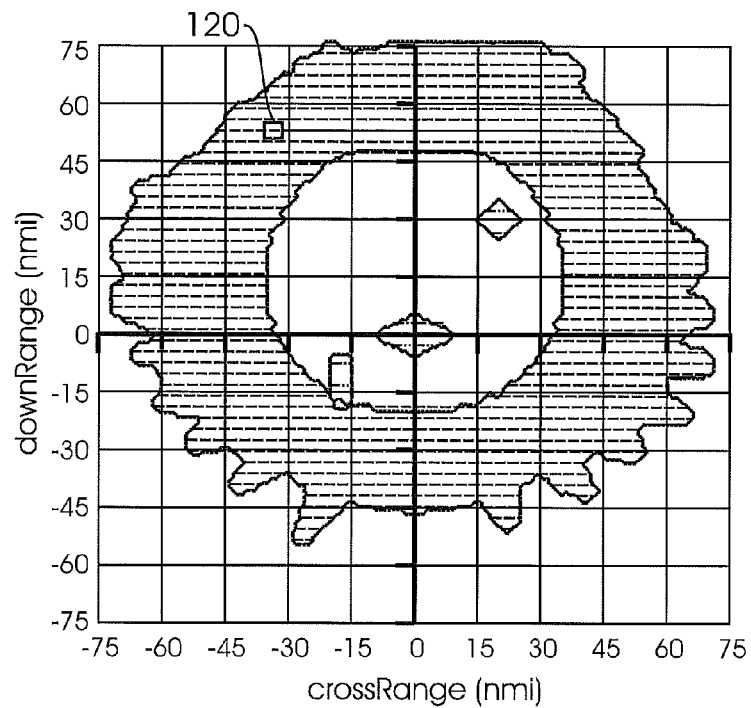
FIGS. 17(a)-(c) show combined performance regions of a complex EMS footprint and a threat footprint each having holes within their respective boundary regions that are taken into account when forming individual rectilinear footprints as well as the combined footprints using the methods described herein.
Figure 17B:
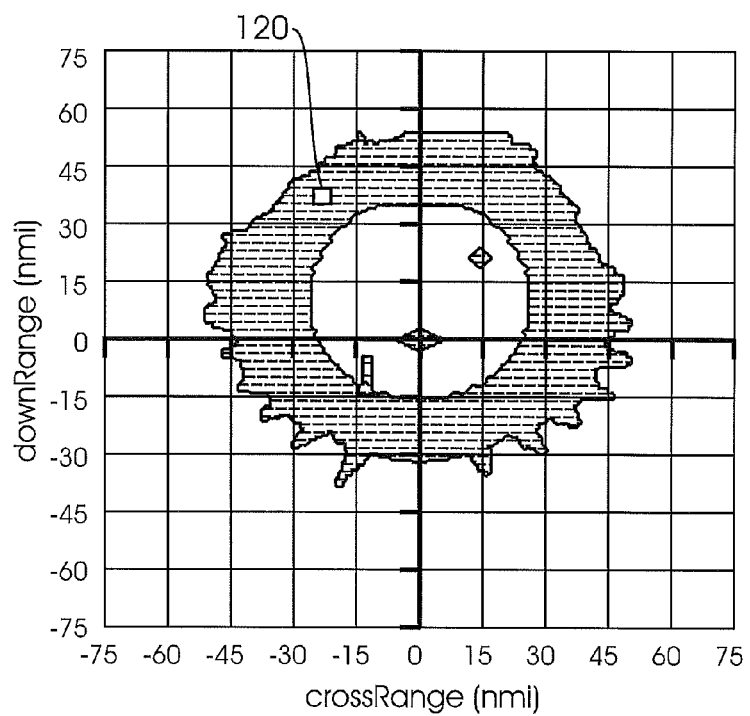
Figure 17C:
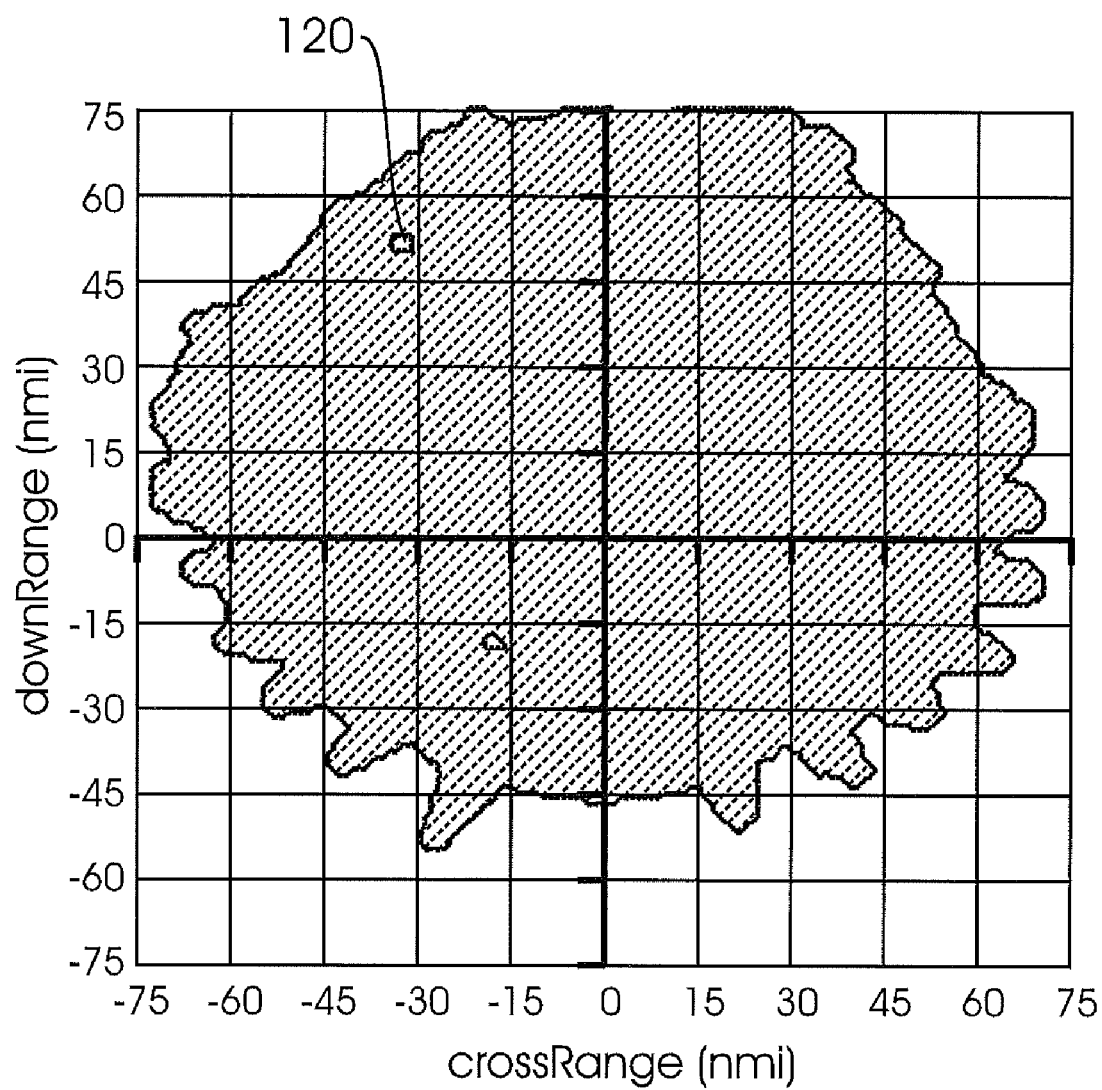

FIGS. 15(a)-(b) and 16(a)-(b), show other examples of solution data sets, combined performance regions, or footprints for the union and intersection of other sensor footprints, while FIGS. 17(a)-(c) show combined performance regions of complex EMS and threat footprints 10, 14 each having holes 120 within their respective regions that are taken into account when forming individual rectilinear footprints as well as the solution footprints using the methods described herein.

The systems and methods of various embodiments have been described with some particularity, but the specific designs, constructions, and/or steps disclosed are not to be taken as limiting. Although the method(s) are illustrated and described herein as occurring in a certain order, the specific order, or any combination or interpretation of the order, is not required. Obvious modifications will make themselves apparent to those of ordinary skill in the art, all of which will not depart from the essence of disclosed subject matter, and all such changes and modifications are intended to be encompassed within the appended claims.

What is claimed is:

1. A computer processor implemented method, comprising:
   selecting, by the processor, a first data set other than a rectilinear data set, the first data set having a closed boundary formed by a plurality of data points plotted on a rectilinear coordinate system;
   filling, by the processor, the closed boundary with data points to form a first footprint; and
   converting, by the processor, the first footprint to a first rectilinear footprint, including:
      populating the first rectilinear footprint with a grid vertex of the rectilinear coordinate system for which at least one of the data points of the first footprint is contained within a tolerance field about the grid vertex; and
      completing the first rectilinear footprint as those grid vertices of the rectilinear coordinate system with which the first rectilinear footprint has been populated.

2. The method of claim 1, further comprising:
   selecting a second data set other than a rectilinear data set, the second data set having a closed boundary formed by a plurality of data points plotted on a coordinate system;
   filling the closed boundary with data points to form a second footprint;
   converting the second footprint to a second rectilinear footprint by populating the coordinate system using an interpolation operation having a tolerance field; and
   comparing the first rectilinear footprint and the second rectilinear footprint to form a footprint representing one of a union, an intersection, or a margin of the first rectilinear footprint and the second rectilinear footprint.

3. The method of claim 1, further comprising:
   selecting a rectilinear footprint other than the first rectilinear footprint; and
   comparing the first rectilinear footprint and the other rectilinear footprint to form a footprint representing one of a union, an intersection, or a margin of the first rectilinear footprint and the second rectilinear footprint.

4. The method of claim 1, wherein the populating comprises:
   accessing a vertex of the coordinate system;
   designating a tolerance field about the vertex;
   determining if at least one of the plurality of data points is contained within the tolerance field;

retaining the vertex and populating the first rectilinear footprint with the vertex if the at least one of the plurality of data points is contained within the tolerance field;

excluding the vertex from the first rectilinear footprint if the at least one of the plurality of data points is not contained within the tolerance field; and performing the accessing, designating, determining, retaining, and excluding operations on substantially all the vertices of the coordinate system.

5. The method of claim 2, wherein the interpolation operation comprises:

accessing a vertex of the coordinate system;

designating a tolerance field about the vertex;

determining if at least one of the plurality of data points is contained within the tolerance field;

retaining the vertex and populating the second rectilinear footprint with the vertex if the at least one of the plurality of data points is contained within the tolerance field;

excluding the vertex from the second rectilinear footprint if the at least one of the plurality of data points is not contained within the tolerance field; and performing the interpolation operation on substantially all the vertices of the coordinate system.

6. The method of claim 1, wherein selecting a first data set other than a rectilinear data set includes choosing one of a radial data set or a polar data set.

7. The method of claim 6, wherein the one of a radial data set or a polar data set is a sensor performance region of one of a radar, weapon, threat, electronic support measure (ESM), or electro-optical/infrared (EO/IR).

8. A system, comprising:

a storage device;

a processing element having a processing program and access to the storage device;

a processing-readable medium having executable instructions thereon to direct the processing program when used by the processing element to:

select a first data set other than a rectilinear data set, the data set having a closed boundary formed by a plurality of data points plotted on a coordinate system;

fill the closed boundary with data points to form a first footprint; and convert the first footprint to a first rectilinear footprint including:

populating the first rectilinear footprint with a grid vertex of the coordinate system for which at least one of the data points of the first footprint is contained within a tolerance field about the grid vertex; and completing the first rectilinear footprint as those grid vertices of the rectilinear coordinate system with which the first rectilinear footprint has been populated.

9. The system of claim 8, wherein the processing-readable medium further includes executable instructions thereon to direct the processing program when used by the processing element to:

select a second data set other than a rectilinear data set, the second data set having a closed boundary formed by a plurality of data points plotted on a coordinate system;

fill the closed boundary with data points to form a second footprint;

convert the second footprint to a second rectilinear footprint by populating the coordinate system using an interpolation operation having a tolerance field; and compare the first rectilinear footprint and the second rectilinear footprint to form a footprint representing one of a union, an intersection, or a margin of the first rectilinear footprint and the second rectilinear footprint.

10. The system of claim 8, wherein the processing-readable medium further includes executable instructions thereon to direct the processing program when used by the processing element to:

select a rectilinear footprint other than the first rectilinear footprint; and compare the first rectilinear footprint and the other rectilinear footprint to form a footprint representing one of a union, an intersection, or a margin of the first rectilinear footprint and the second rectilinear footprint.

11. The system of claim 8, wherein the processing-readable medium further includes executable instructions thereon to direct the processing program when used by the processing element to:

access a vertex of the coordinate system;

designate a tolerance field about the vertex;

determine if at least one of the plurality of data points is contained within the tolerance field;

retain the vertex and populating the first rectilinear footprint with the vertex if the at least one of the plurality of data points is contained within the tolerance field;

exclude the vertex from the first rectilinear footprint if the at least one of the plurality of data points is not contained within the tolerance field; and perform the accessing, designating, determining, retaining, and excluding operations on substantially all the vertices of the coordinate system.

12. The system of claim 9, wherein the processing-readable medium further includes executable instructions thereon to direct the processing program when used by the processing element to:

access a vertex of the coordinate system;

designate a tolerance field about the vertex;

determine if at least one of the plurality of data points is contained within the tolerance field;

retain the vertex and populating the second rectilinear footprint with the vertex if the at least one of the plurality of data points is contained within the tolerance field;

exclude the vertex from the second rectilinear footprint if the at least one of the plurality of data points is not contained within the tolerance field; and perform the interpolation operation on substantially all the vertices of the coordinate system.

13. The system of claim 8, wherein the first data other than a rectilinear data set is one of a radial data set or a polar data set.

14. A non-transitory computer-readable medium having computer executable instructions for performing a method comprising:

selecting a first data set other than a rectilinear data set, the first data set having a closed boundary formed by a plurality of data points plotted on a coordinate system;

filling the closed boundary with data points to form a first footprint; and converting the first footprint to a first rectilinear footprint by, including:

populating the first rectilinear footprint with a grid vertex of the coordinate system for which at least one of the data points of the first footprint is contained within a tolerance field about the grid vertex; and completing the first rectilinear footprint as those grid vertices of the rectilinear coordinate system with which the first rectilinear footprint has been populated.

15. The computer-readable medium of claim 14, further having instructions for performing a method comprising:
- selecting a second data set other than a rectilinear data set, the second data set having a closed boundary formed by a plurality of data points plotted on a coordinate system;
- filling the closed boundary with data points to form a second footprint;
- converting the second footprint to a second rectilinear footprint by populating the coordinate system using an interpolation operation having a tolerance field; and
- comparing the first rectilinear footprint and the second rectilinear footprint to form a footprint representing one of a union, an intersection, or a margin of the first rectilinear footprint and the second rectilinear footprint.

16. The computer-readable medium of claim 14, further having instructions for performing a method comprising:
- selecting a rectilinear footprint other than the first rectilinear footprint; and
- comparing the first rectilinear footprint and the other rectilinear footprint to form a footprint representing one of a union, an intersection, or a margin of the first rectilinear footprint and the other rectilinear footprint.

17. The computer-readable medium of claim 14, further having instructions for performing the populating comprising:
- accessing a vertex of the coordinate system;
- designating a tolerance field about the vertex;
- determining if at least one of the plurality of data points is contained within the tolerance field;
- retaining the vertex and populating the first rectilinear footprint with the vertex if the at least one of the plurality of data points is contained within the tolerance field;
- excluding the vertex from the first rectilinear footprint if the at least one of the plurality of data points is not contained within the tolerance field; and
- performing the accessing, designating, determining, retaining, and excluding operations on substantially all the vertices of the coordinate system.

18. The computer-readable medium of claim 15, further having instructions for performing the interpolation operation comprising:
- accessing a vertex of the coordinate system;
- designating a tolerance field about the vertex;
- determining if at least one of the plurality of data points is contained within the tolerance field;
- retaining the vertex and populating the second rectilinear footprint with the vertex if the at least one of the plurality of data points is contained within the tolerance field;
- excluding the vertex from the second rectilinear footprint if the at least one of the plurality of data points is not contained within the tolerance field; and
- performing the interpolation operation on substantially all the vertices of the coordinate system.

19. The computer-readable medium of claim 14, wherein selecting a first data set other than a rectilinear data set includes choosing one of a radial data set or a polar data set.

20. The computer-readable medium of claim 19, wherein the one of a radial data set or a polar data set is a sensor performance region of one of a radar, weapon, threat, electronic support measure (ESM), or electro-optical/infrared (EO/IR).

* * * * *